(12) United States Patent
Kistner (10) Patent No.: US 9,964,128 B2
(45) Date of Patent: May 8, 2018

(54) MASTER BRAKE CYLINDER SYSTEM AND BRAKE SYSTEM FOR A VEHICLE

(71) Applicant: Robert Bosch GmbH, Stuttgart (DE)

(72) Inventor: Matthias Kistner, Bretzfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 482 days.

(21) Appl. No.: 14/284,118

(22) Filed: May 21, 2014

(65) Prior Publication Data

US 2014/0345272 A1    Nov. 27, 2014

(30) Foreign Application Priority Data

May 24, 2013    (DE) .................... 10 2013 209 733

(51) Int. Cl.
| | |
|---|---|
| *B60T 13/00* | (2006.01) |
| *F15B 19/00* | (2006.01) |
| *B60T 7/04* | (2006.01) |
| *B60T 11/16* | (2006.01) |
| *B60T 13/14* | (2006.01) |
| *B60T 13/66* | (2006.01) |
| *B60T 13/68* | (2006.01) |
| *B60T 8/40* | (2006.01) |

(52) U.S. Cl.
CPC ............ *F15B 19/007* (2013.01); *B60T 7/042* (2013.01); *B60T 8/4081* (2013.01); *B60T 11/16* (2013.01); *B60T 13/146* (2013.01); *B60T 13/662* (2013.01); *B60T 13/686* (2013.01)

(58) Field of Classification Search
CPC ...... B60T 8/4081; B60T 8/4086; B60T 8/409; B60T 11/20; B60T 11/224
See application file for complete search history.

(56) References Cited

U.S. PATENT DOCUMENTS

| | | | | |
|---|---|---|---|---|
| 5,609,401 | A | * | 3/1997 | Johnston ................. B60T 8/365 303/113.4 |
| 6,012,288 | A | * | 1/2000 | Gualdoni ................ B60T 11/16 29/888.06 |

(Continued)

FOREIGN PATENT DOCUMENTS

| | | |
|---|---|---|
| CN | 103079914 A | 5/2013 |
| DE | 10 2010 003 081 | 8/2011 |

*Primary Examiner* — Thomas E Lazo
*Assistant Examiner* — Dustin T Nguyen
(74) *Attorney, Agent, or Firm* — Norton Rose Fulbright US LLP; Gerard Messina (57) ABSTRACT

A master brake cylinder system having a master brake cylinder housing having at least one first pressure chamber and a second pressure chamber, a rod piston at least partially displaceable into the first pressure chamber, a floating piston situated between the first pressure chamber and second pressure chamber, and a simulator device having a simulator piston, which is at least partially displaceable into the simulator chamber counter to a spring force of at least one simulator spring present in a simulator chamber, the simulator piston of the simulator device being situated as to the second pressure chamber so that the simulator piston is displaceable at least partially into the simulator chamber, using a pressure present in the second pressure chamber against the spring force of the at least one simulator spring. In addition, also described is a brake system for a vehicle having a master brake cylinder system.

5 Claims, 6 Drawing Sheets

(56) References Cited

U.S. PATENT DOCUMENTS

| | | | | |
|---|---|---|---|---|
| 6,354,673 | B1* | 3/2002 | Feigel | B60T 7/042 303/113.4 |
| 6,464,307 | B1* | 10/2002 | Yoshino | B60T 7/042 303/11 |
| 7,008,023 | B2* | 3/2006 | Nakashima | B60T 8/38 188/358 |
| 7,431,407 | B2* | 10/2008 | Kamiya | B60T 8/3655 303/114.3 |
| 7,748,791 | B2* | 7/2010 | Joyce | B60T 7/042 303/11 |
| 7,748,794 | B2* | 7/2010 | Tsunehara | B60T 8/3275 303/155 |
| 2004/0061375 | A1* | 4/2004 | Drott | B60T 7/042 303/20 |
| 2014/0117602 | A1* | 5/2014 | Jeon | B60T 7/042 267/170 |

* cited by examiner

Fig. 8

MASTER BRAKE CYLINDER SYSTEM AND BRAKE SYSTEM FOR A VEHICLE

RELATED APPLICATION INFORMATION

The present application claims priority to and the benefit of German patent application no. 10 2013 209 733.6, which was filed in Germany on May 24, 2013, the disclosure of which is incorporated herein by reference.

FIELD OF THE INVENTION

The present invention relates to a master brake cylinder system. In addition, the present invention relates to a brake system for a vehicle.

BACKGROUND INFORMATION

German document DE 10 2010 003 081 A1 discusses a brake system for motor vehicles. The brake system has a housing within which two pressure chambers of a master brake cylinder are developed. In addition, the housing includes an intermediate space between the two pressure chambers and the brake pedal, at which a simulator device is linked, having a simulator spring situated in a simulator chamber and a simulator piston that is displaceable against the spring force of the simulator spring into the simulator chamber.

SUMMARY OF THE INVENTION

The present invention provides for a master brake cylinder system, having the features described herein and a brake system for a vehicle, having the features described herein.

The present invention makes possible a reduction of the components interposed between a brake operating element (such as a brake pedal) and the two pressure chambers of the master brake cylinder. As will be stated in greater detail below, this facilitates the construction of the master brake cylinder system. In addition, using the present invention, one is able to reduce the overall extension of a brake system developed as a master brake cylinder system, along a displacement direction of its input rod, its rod piston and/or its floating piston. This facilitates the assembly of the brake system developed as a master brake cylinder system in a motor vehicle.

The master brake cylinder system according to the present invention also makes possible a comfortable brake operating feel (pedal feel) for a driver operating the brake operating element. Using a spring constant of the at least one simulator spring, a displacement/force characteristic of the brake operating feel may be established in a simple manner. As will still be explained in addition below, using the present invention, still other components, which are conventionally often already present in a brake system, are used to procure a more agreeable brake operating feel.

Moreover, the present invention assures a master brake cylinder system whose operation is free from idle strokes. As will be stated in greater detail below, the master brake cylinder system according to the present invention may also be utilized to implement a brake system having an advantageous safety standard.

In one advantageous specific embodiment, the simulator device has at least one separating valve via which the simulator chamber is able to be linked hydraulically to a brake fluid reservoir. The simulator device is thus able to be controlled, by the control of the at least one separating valve, into a closed state in such a way that compressing the at least one simulator spring is prevented, and the spring constant of the at least one simulator spring thus has no effect whatsoever on the brake operating feel. The at least one separating valve may also optionally be controlled to an open state in such a way that, to the extent that this is desired, using the at least one simulator spring, an additional spring force that counteracts the operation of the brake operating element is able to be transferred to the brake operating element.

In an optional manner, the simulator device is able to have two separating valves connected in series, via which the simulator spring is able to be linked hydraulically to the brake fluid reservoir. Consequently, a functional failure of one of the two separating valves is able to be bridged.

In one further advantageous specific embodiment, the at least one simulator spring is a rubber spring. Consequently, even when a cost-effective spring type is used for the at least one simulator spring, an advantageously high stiffness of it is ensured.

As an alternative or in supplement to this, the simulator chamber may have a first diameter aligned perpendicular to a first displacement direction of the simulator piston, which is greater than a second diameter of the second pressure chamber aligned perpendicular to a second displacement direction of the floating piston. Thus, a relatively large diameter may also be selected for the at least one simulator spring. In this way, the stiffness of the at least one simulator spring may be increased.

In one specific embodiment, the simulator piston is situated displaceably between the simulator chamber and an anterior chamber, the anterior chamber being hydraulically linked to the second pressure chamber via at least one line. The simulator device may thus be particularly a component of a brake circuit linked to the second pressure chamber. The advantageous situation of the simulator piston, in such a way that the simulator piston is able to be displaced into the simulator chamber, using the pressure prevailing in the second pressure chamber, may thus be implemented without an increase in the extension of the master brake cylinder housing along a displacement direction of the rod piston and/or the floating piston.

In one alternative advantageous specific embodiment, the simulator device is at least partially integrated into the master brake cylinder housing, and the simulator piston is situated displaceably between the simulator chamber developed in the master brake cylinder housing and the second pressure chamber in the master brake cylinder housing. Such an integration of the simulator device into the master brake cylinder housing significantly simplifies the assembly of the master brake cylinder system on a vehicle.

The at least one simulator spring is advantageously able to be supported on a side directed away from the simulator piston, on an element which is fastened at a distance from a cap that is mounted on the master brake cylinder housing in the simulator chamber. This is able to prevent that the spring force of the at least one simulator spring presses against the cap. In this way one may implement a simple safety concept, since an individual fault, such as the loosening of the cap, does not lead to the failure of the entire brake system. The element may be a snap ring, for instance.

In one advantageous refinement, the simulator chamber is connected hydraulically via a valve to at least one pump and/or at least one brake circuit. Using the at least one pump, vibrations are able to be transmitted to the simulator device as pedal feedback. This is able to improve the brake operating feel for the driver. In addition, because of the advantageous linking of the simulator chamber to the at least one wheel brake cylinder of the at least one brake circuit, a brake pressure present in it may be raised, especially in an emergency braking situation.

The simulator chamber is particularly able to be hydraulically connected to the at least one brake circuit via a valve developed as a pressure relief valve. Consequently, even a comparatively cost-effective valve type may be utilized for linking the simulator chamber to the at least one brake circuit which, in an emergency braking situation, ensures the automatic opening of the valve. In addition, this ensures an improvement in the fallback level by feeding in additional brake fluid from the simulator chamber.

The advantages stated above are also ensured in the case of a corresponding brake system for a vehicle having such a master brake cylinder system.

Additional features and advantages of the present invention are elucidated below, with reference to the figures.

DETAILED DESCRIPTION

Figure 1:
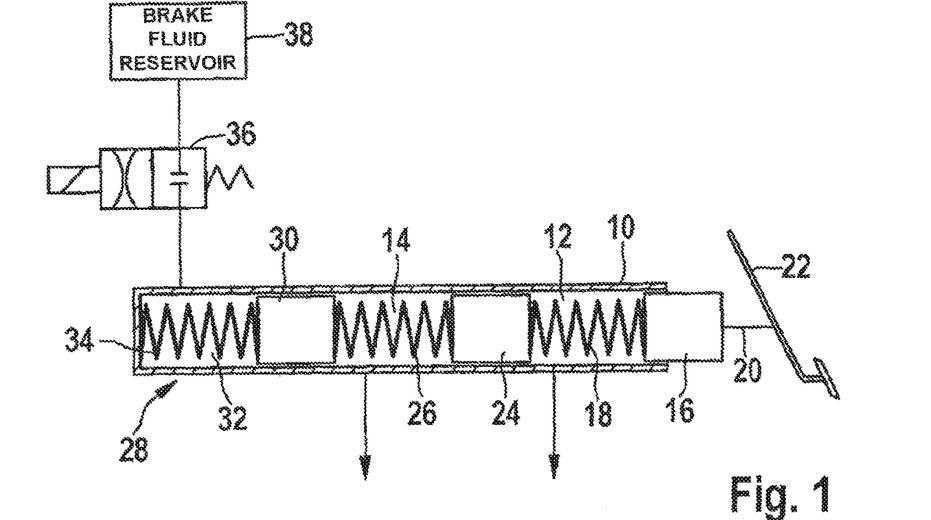
FIG. 1 a schematic representation of a first specific embodiment of the master brake cylinder system.

FIG. 1 shows a schematic representation of a first specific embodiment of the master brake cylinder system.

The master brake cylinder system shown schematically in FIG. 1 may be used in a brake system of a motor vehicle. The master brake cylinder system has a master brake cylinder housing 10 having at least one first pressure chamber 12 developed in it and a second pressure chamber 14 developed in it. A rod piston 16 is at least partially displaceable into first pressure chamber 12. The displacing in of rod piston 16 may take place using a driver brake force and/or using a booster force provided by an optional brake booster against a first return spring 18 situated in first pressure chamber 12. The driver brake force may be transmitted, for example, via an input rod 20 of a brake operating element 22, such as a brake pedal, to rod piston 16. A plurality of various types of brake boosters may be used to exert the booster force additionally on rod piston 16. It should be pointed out, however, that the master brake cylinder system may also be used without a brake booster.

Master brake cylinder housing 10 also includes a floating piston 24, which is situated between first pressure chamber 12 and second pressure chamber 14. Floating piston 24 may be supported both on first return spring 18 and on a second return spring 26 situated in second pressure chamber 14.

The master brake cylinder system also has a simulator device 28 having a simulator piston 30, which is at least partially displaceable into simulator chamber 32 against a spring force of at least one simulator spring 34 that is present in a simulator chamber 32. Simulator piston 30 of simulator device 28 is situated with respect to second pressure chamber 14 in such a way that simulator piston 30, using a pressure present in second pressure chamber 14, is displaceable at least partially into simulator chamber 32 at least partially against the spring force of the at least one simulator spring 34. One may also describe this in different terms, and say that the pressure present in second pressure chamber 14 is able to be transmitted directly to simulator piston 30 in such a way that the simulator piston is displaceable based on the comparatively large pressure against the spring force of the at least one simulator spring 34. By this one may also understand that a direct contact is present between a brake fluid volume, which lies at least partially within second pressure chamber 14, and simulator piston 30.

Based on the advantageous situation of simulator piston 30 with respect to second pressure chamber 14, one may do without linking simulator device 28 to a component of the master brake cylinder system lying between the two pressure chambers 12 and 14 and brake operating element 22. Consequently, the necessity of developing a comparably complicated linking of brake operating element 22 to rod piston 16 drops out. In particular, the comparatively costly linking of the related art is no longer required in the case of the development of simulator device 28 according to the present invention. This leads to a more compact development of the master brake cylinder system. In addition, the assembly of the master brake cylinder system on a motor vehicle is clearly made easier. Whereas idle strokes are still able to occur in the related art, this disadvantage is reliably prevented in the master brake cylinder system of FIG. 1.

In the specific embodiment of FIG. 1, simulator device 28 is at least partially integrated into master brake cylinder housing 10. For this, simulator piston 30 is situated displaceably between simulator chamber 32, that is developed in master brake cylinder housing 10, and second pressure chamber 14 in master brake cylinder housing 10. For example, simulator piston 30 may be developed as a further floating piston, which is supported on a first side on second return spring 26 and on an opposite second side on simulator spring 34.

Because of the at least partial integration of simulator device 28 into master brake cylinder housing 10, the necessity of having its own simulator housing drops out. Consequently, costs may be saved in the production of the more compactly developed master brake cylinder system. Again, working steps may be omitted in mounting the master brake cylinder system as opposed to mounting a master brake cylinder and a simulator developed separately from it. Furthermore, in an at least partial integration of simulator device 28 into master brake cylinder housing 10, the same components, such as the same seals, may be used for the master brake cylinder having pressure chambers 12 and 14 and simulator device 28. This may be utilized for additional cost savings in the production of the master brake cylinder system.

It is pointed out, however, that a partial integration/ complete integration of simulator device 28 into master brake cylinder housing 10 is optional. As will be stated below in greater detail, many advantages of the master brake cylinder system of FIG. 1 and the specific embodiments described further on are ensured even in a corresponding system not having partial integration of simulator device 28 into master brake cylinder housing 10. It is pointed out, however, that the development of simulator device 28 shown in FIG. 1 is especially advantageous in series/as an extension of the master brake cylinder, because of the low response forces.

For simulator device 28, a comparatively high stiffness of the at least one simulator spring 34 may be used. For this, the at least one simulator spring 34 may also be a rubber spring. A spring thus developed, made of an elastomer, ensures a comparatively high stiffness in comparison to a spring made of metal. Additional possibilities for raising the stiffness of the at least one simulator spring 34 will be further described below.

In the specific embodiment of FIG. 1, simulator chamber 32 has additionally at least one separating valve 36, via which simulator chamber 32 is able to be linked hydraulically to a brake fluid reservoir 38. (Pressure chambers 12 and 14 may also be linked to brake fluid reservoir 38 via an hydraulic link (that is not sketched). The at least one separating valve 36 may be integrated into master brake cylinder housing 10 or may be situated externally to it. Using a control of the at least one separating valve 36 into a closed state, the compressing of the at least one simulator spring 34 may be reliably prevented in spite of a comparatively great force transmitted to simulator piston 30. Consequently, by the closing of the at least one separating valve 36, simulator device 28 may be controlled into a mode in which no force counteracting the operation of brake operating element 22 is able to be provided by the at least one simulator spring 34. This is advantageous, above all, if the driver intends to effect a high pressure buildup in pressure chambers 12 and 14 using a comparatively low force. Otherwise, the at least one simulator spring 34 may be used to increase the counteracting force counteracting the operation of brake operating element 22, by controlling the at least one separating valve 36 in an open state.

In one refinement, simulator device 28 is able to have two separating valves 36 connected in series, via which simulator chamber 32 is able to be linked hydraulically to brake fluid reservoir 38. Consequently, a functional failure of one of the two separating valves 36 is easily able to be bridged. This is also ensured provided the functional failure of one of the two separating valves 36 occurs simultaneously with a system failure.

Figure 2:
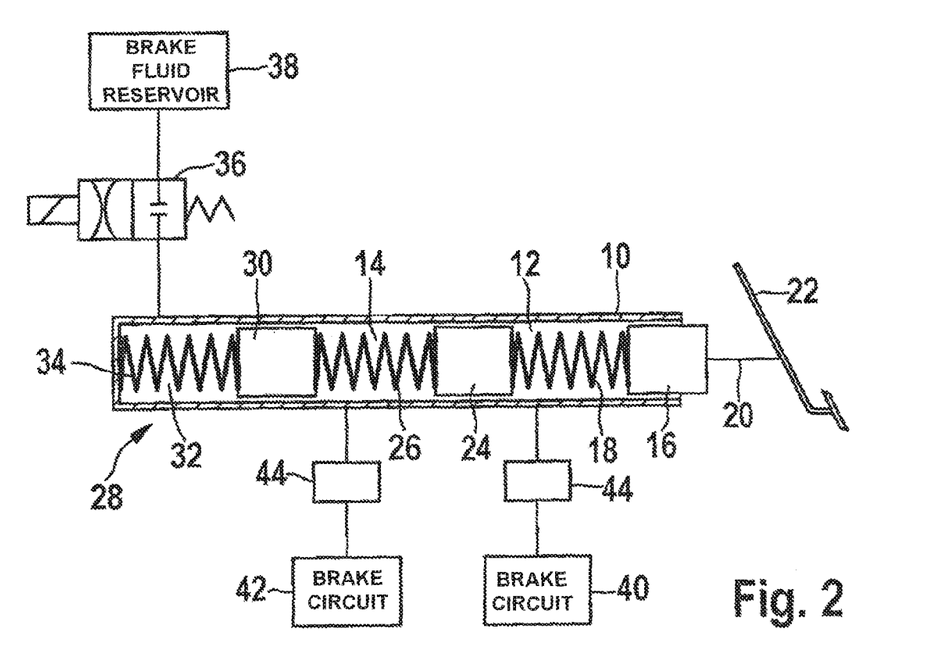
FIG. 2 a schematic representation of a first specific embodiment of the brake system.

FIG. 2 shows a schematic representation of a first specific embodiment of the brake system.

In addition to the master brake cylinder system of FIG. 1 already described above, the brake system of FIG. 2 has two schematically shown brake circuits 40 and 42, a first brake circuit 40 being hydraulically linked via an interposed separating valve 44 to first pressure chamber 12 and a second brake circuit 42 being hydraulically linked via a further interposed separating valve 44 to second pressure chamber 14.

Thus, the brake system shown in FIG. 2 may be used particularly advantageously together with a generator as a recuperative brake system. By the closing of at least one of separating valves 44, at least one of brake circuits 40 and 42 is able to be decoupled from brake operating element 22. The omitted braking action of at least one of the (not sketched) wheel brake cylinders of brake circuits 40 and 42 may be utilized for the regenerative operation of the generator while simultaneously charging a vehicle battery, without a vehicle deceleration specified by a driver, using the operation of brake operating element 22, being exceeded.

Figure 3:
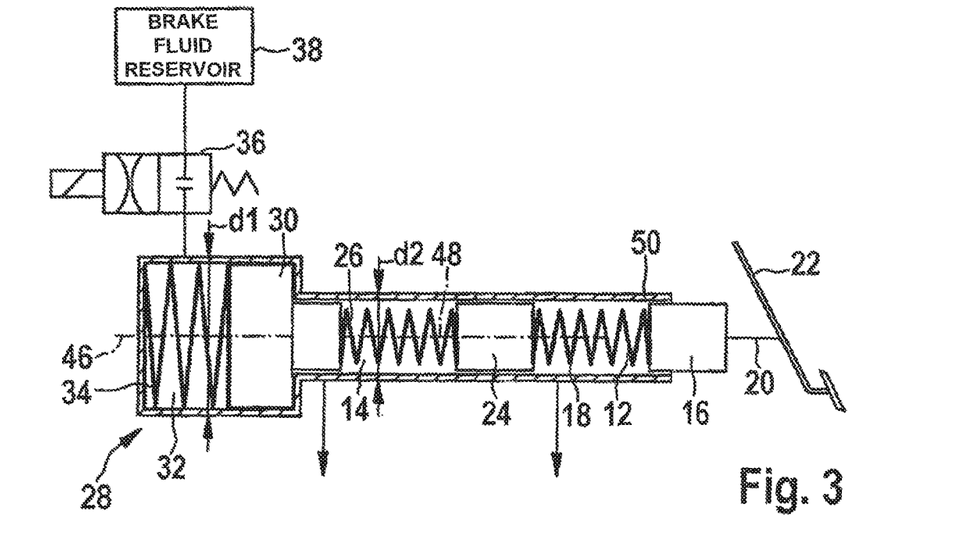
FIG. 3 a schematic representation of a second specific embodiment of the master brake cylinder system.

FIG. 3 shows a schematic illustration of a second specific embodiment of the master brake cylinder system.

The master brake cylinder system shown schematically in FIG. 3 has a simulator chamber 32 having a first diameter d1, aligned perpendicular to a first displacement direction 46 of simulator piston 30, first diameter d1 being greater than a second diameter d2 of second pressure chamber 14 and/or of first pressure chamber 12, that is aligned perpendicular to a second displacement direction 48 of floating piston 24 of second pressure chamber 14. This being the case, at least one simulator spring 34 having a comparatively large diameter is able to be used in simulator chamber 32. Also, by using at least one simulator spring 34, having a comparatively large diameter which, for instance, is made of an elastomer/rubber, an advantageously high stiffness of the at least one simulator spring 34 is able to be implemented. Consequently, for example, in the case of a displacement path of simulator piston 30 from its initial position into simulator chamber 32 of ca. 20 mm, a counteracting force of 600 to 800 N is able to be effected.

Based on the different diameters d1 and d2 of chambers 12, 14 and 32, braking areas A1 and A2 of pistons 16, 24 and 30 may also be of different sizes. In particular, a first braking area A1 of simulator piston 30, by which the varying volume of simulator chamber 32 is bordered, may be (clearly) larger than a second braking surface A2 of floating piston 24 into second pressure chamber 14 and/or of rod piston 16 into first pressure chamber 12. We shall go into an advantageous utilization possibility of the different braking areas in greater detail below.

In the specific embodiment of FIG. 3, simulator device 28 is integrated into master brake cylinder housing 50 that is developed as a stepped piston 50. Simulator piston 30 may take the form of a stepped piston 30. We should point out, however, that the advantageous development of simulator device 28 having a comparatively large first diameter d1 is not limited to the integration of simulator device 28 into master brake cylinder housing 50.

Figure 4:
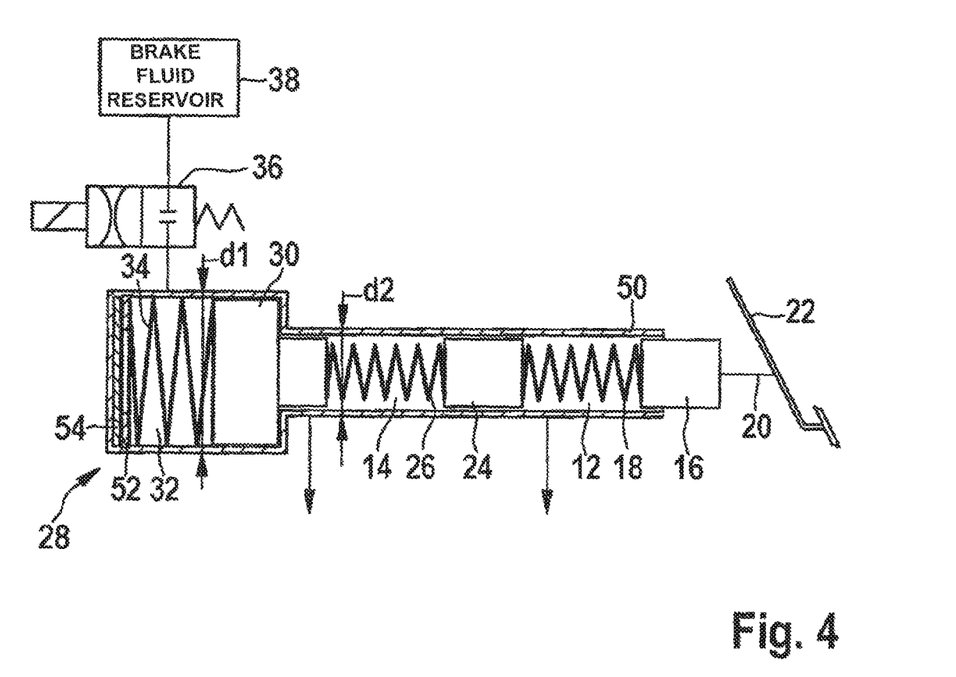
FIG. 4 a schematic representation of a third specific embodiment of the master brake cylinder system.

FIG. 4 shows a schematic representation of a third specific embodiment of the master brake cylinder system.

In the specific embodiment of FIG. 4, the at least one simulator spring 34 is supported on a side directed away from simulator piston 30, on an element 52. Element 52 is fastened in simulator chamber 32, at a distance from a cap 54 mounted on master brake cylinder housing 50. In this way it may be avoided that the spring force of the at least one simulator spring 34 presses directly against cap 54. A reliable support of cap 54 on master brake cylinder housing 50 is thus ensured. Element 52 may be a snap ring 52, for instance.

Figure 5:
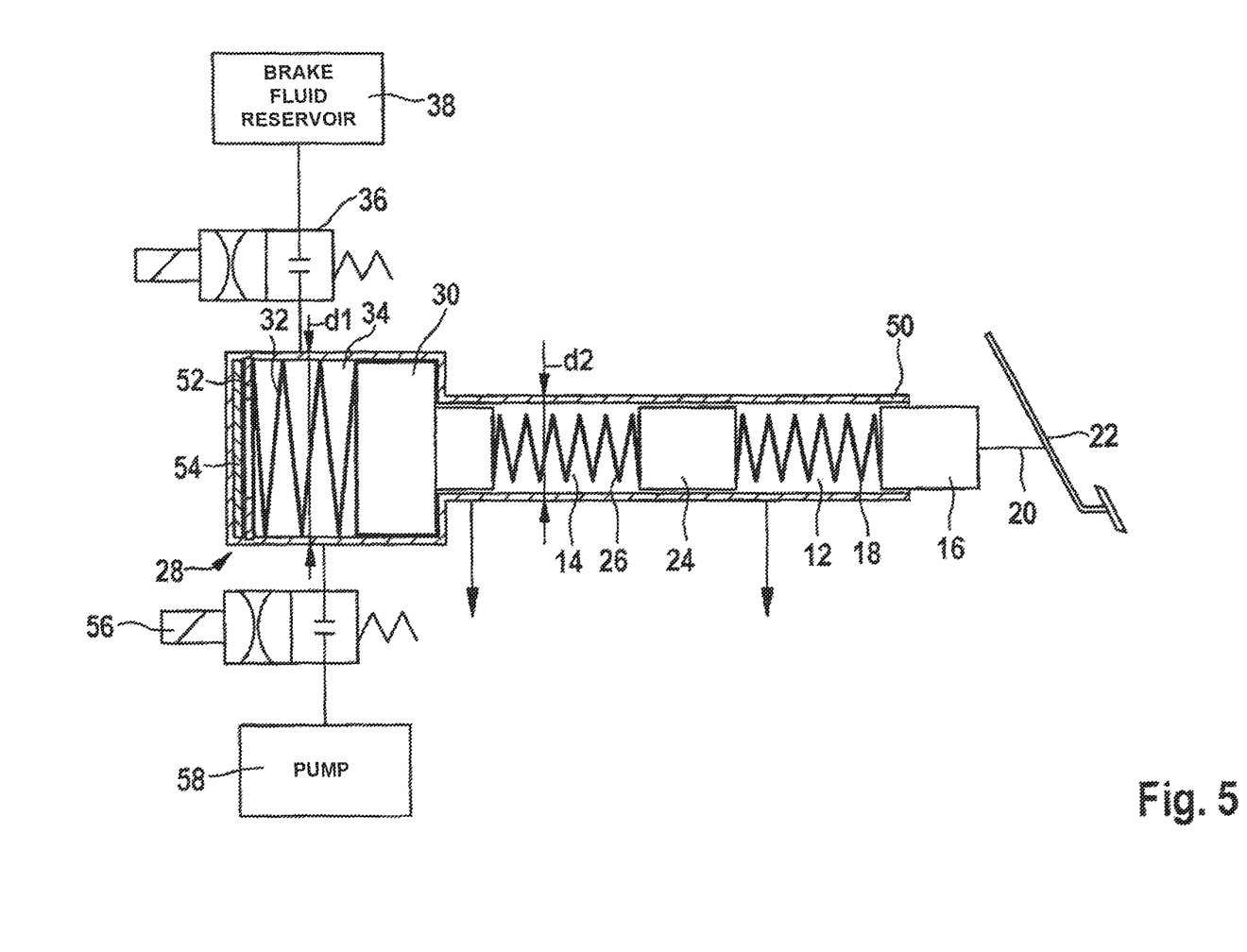
FIG. 5 a schematic representation of a fourth specific embodiment of the master brake cylinder system.

FIG. 5 shows a schematic representation of a fourth specific embodiment of the master brake cylinder system.

The master brake cylinder system of FIG. 5 is a refinement of the previously described specific embodiment. As a supplement, the master brake cylinder system of FIG. 5 has a valve 56, via which simulator chamber 32 is connected hydraulically to at least one pump 58. Simulator device 28 is thus also able to be controlled by switching valve 56 between a passive mode and an active mode. In an active mode, for example, of simulator device 28 (when valve 56 is in its open state) using the operation of the at least one pump 58, a vibration of simulator piston 30 may be effected which is able to be transmitted to brake operating element 22 as a pedal feedback. The driver is able to perceive advantageously such a vibration of brake operating element 22 as an active feedback of the brake system. In addition, an increase/reduction in the pedal force is also demonstrable as a function of driving situations.

Figure 6:
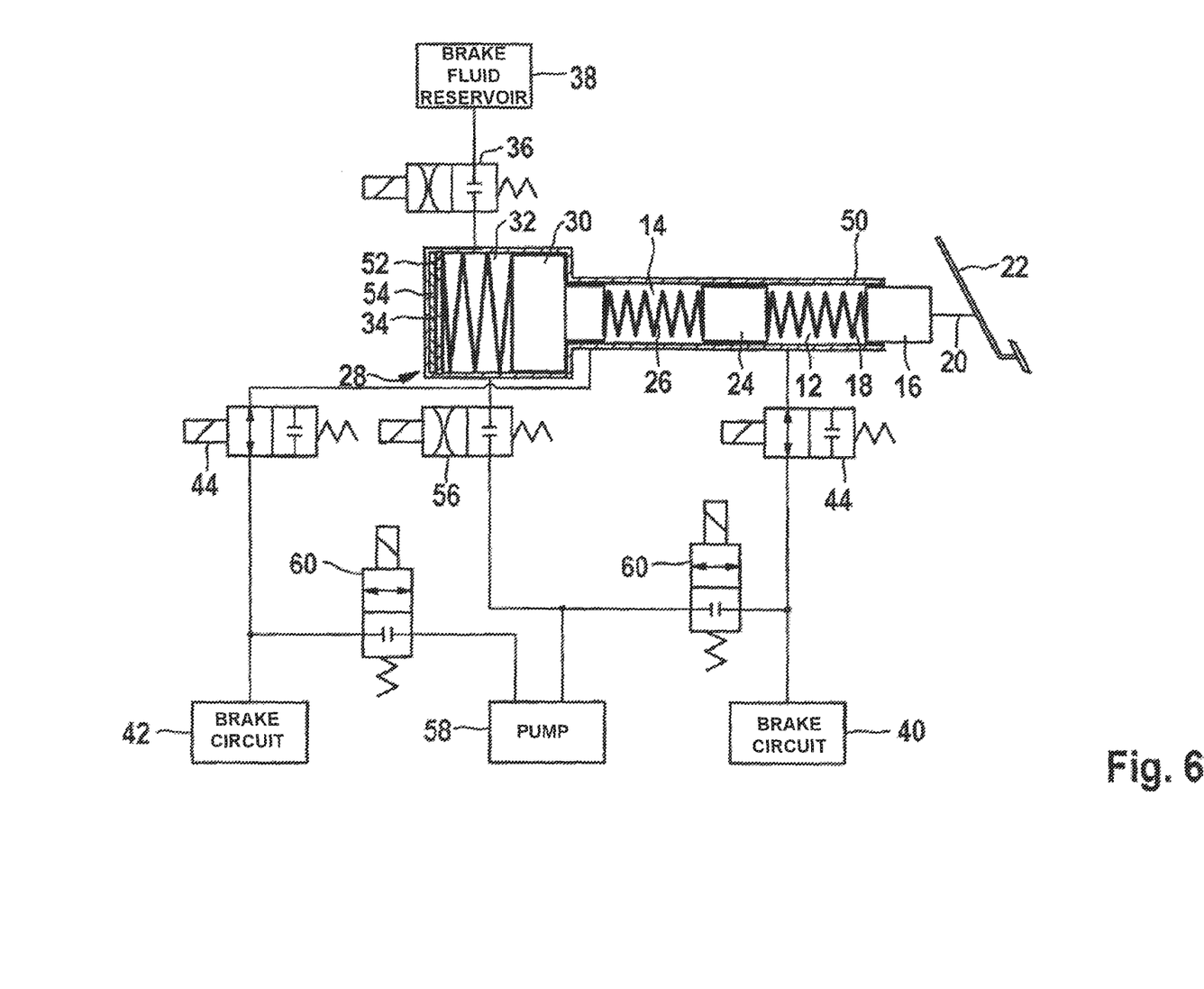
FIG. 6 a schematic representation of a second specific embodiment of the brake system.

FIG. 6 shows a schematic representation of a second specific embodiment of the brake system.

As may be seen with the aid of FIG. 6, in order to effect vibrations of simulator piston 30 of the master brake cylinder system of FIG. 5, also at least one pump 58 may be used, by which a brake pressure is able to be raised in at least one brake circuit 40 and 42. Similarly, the at least one pump 58 may also be used as a return pump of at least one of brake circuits 40 and 42. The at least one pump 58 for triggering vibrations of simulator piston 30 is thus frequently also able to be designated as a component of at least one of brake circuits 40 and 42.

In an optional manner, the at least one pump 58 is connected to brake circuits 40 and 42 via respectively one separating valve 60. However, the linking shown in FIG. 6 of the at least one pump 58 should be interpreted only in exemplary fashion.

Because of the linking of simulator chamber 32, implemented in FIG. 6, to the ESP of brake circuits 40 and 42, the pressure prevailing in simulator chamber 32 is able to be passed on to the wheel brake cylinders (not shown) of brake circuits 40 and 42. As a result, provided a rapid buildup of a comparatively large brake pressure in the wheel brake cylinders is advantageous, by opening valve 56, an additional pressure increase into the wheel brake cylinders may be effected. The force exerted by the driver for building up a pressure in simulator chamber 32 may thus be utilized especially in an emergency braking situation for the more rapid braking of the vehicle equipped with the brake system.

In particular, when using a brake fluid volume displaced from simulator chamber 32 into the at least one brake circuit 40 and 42, at least one wheel brake cylinder (not shown) of the at least one brake circuit 40 and 42 is able to be prefilled. The different diameters d1 and d2 of pressure chambers 12 and 14 and of simulator chamber 32 also prove advantageous for the prefilling.

Therefore, the brake system of FIG. 6 has a particularly advantageous safety standard. In addition, in spite of its comparatively simple configuration, the brake system unites the function of brake boosting with the function of brake force simulation. The different diameters d1 and d2 of pressure chambers 12 and 14 and of simulator chamber 32 may also be used for implementing a "hydraulic reaction disk".

Figure 7:
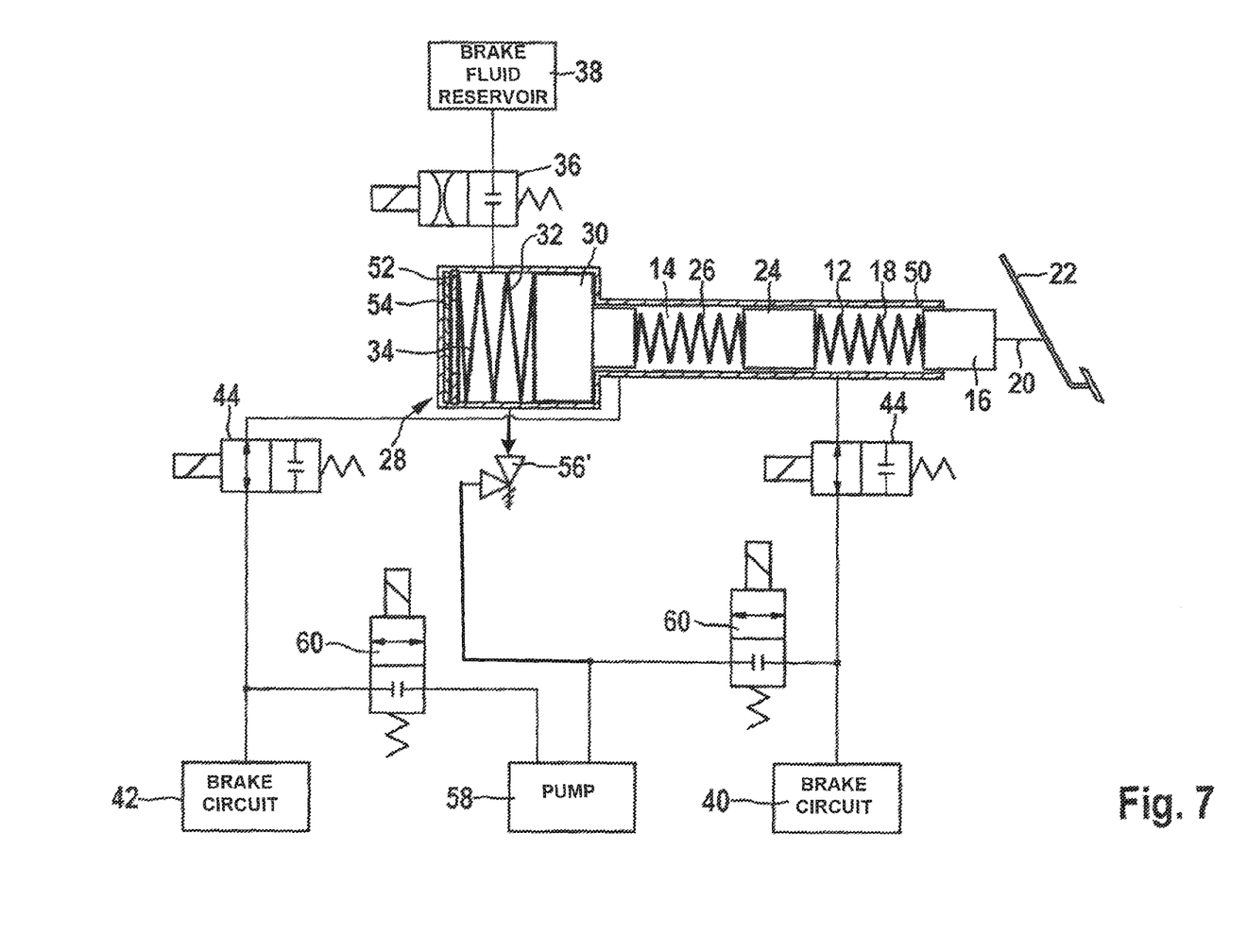
FIG. 7 a schematic representation of a third specific embodiment of the brake system.

FIG. 7 shows a schematic illustration of a third specific embodiment of the brake system.

The brake system rendered schematically in FIG. 7, having the master brake cylinder system of FIG. 5, has as valve 56 a pressure relief valve 56', via which the simulator chamber 32 having the at least one pump 58 and at least one brake circuit 40 and 42 is connected. Pressure relief valve 56' may be configured for an overpressure beginning at at least 3 bar, which may be for an overpressure beginning at at least 5 bar, for instance. Pressure relief valve 56' is aligned in the brake 25 system in such a way that a brake fluid displacement from the at least one pump 58 through pressure relief valve 56' into simulator chamber 32 is prevented.

Normally, comparatively low pressure values (below the opening threshold of pressure relief valve 56') are present in 30 simulator chamber 32. Only in an emergency braking situation, when the driver steps comparatively forcefully on brake operating element 22, is a high pressure built up in simulator chamber 32. In this case, pressure relief valve 56' opens (automatically) and thus effects a utilization of the high pressure prevailing in pressure chamber 32 for raising the brake pressures in brake circuits 40 and 42. Pressure relief valve 56' may thus be designated as an automatic volume increasing device for an emergency braking situation, no control electronic system being needed for detecting the emergency braking situation and for the advantageous actuation of pressure relief valve 56'. The brake system shown in FIG. 7 thereby ensures a particularly advantageous safety standard at comparatively low cost.

Figure 8:
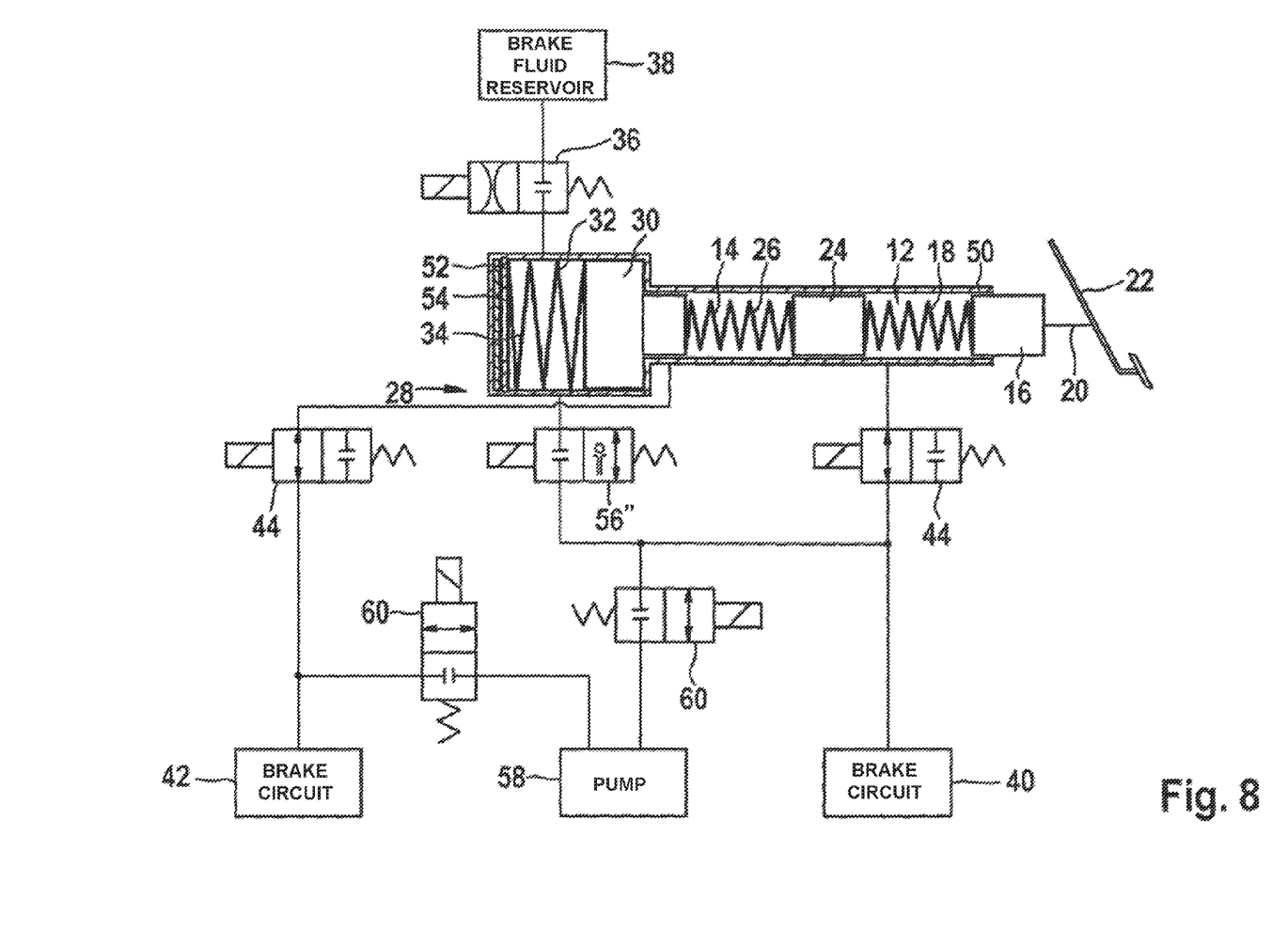
FIG. 8 a schematic representation of a fourth specific embodiment of the brake system.

FIG. 8 shows a schematic representation of a fourth specific embodiment of the brake system.

The brake system of FIG. 8 has a valve 56", which is configured only for a brake fluid transfer from the at least one pump 58 into simulator chamber 32. By the opening of such a valve 56", it is possible to utilize the advantageous relationship between the braking areas of pistons 16, 24 and 30, and between the spring constants of springs 18, 26 and 34 for a mechanical backup. In this context, one may take advantage of the fact that first braking area A1 of simulator piston 30 into simulator chamber 32 is able to be significantly larger than second braking area A2 of floating piston 24 into second pressure chamber 14/of rod piston 16 into first pressure chamber 12, while a simulator force/spring force exerted on simulator piston 30 using the at least one simulator spring 34 is less than a return spring force of return springs 18 and 26. Furthermore, via an opening of valve 56", a feedback may be effected on brake operating element 22 during the carrying out of an ABS function. For blending, it is, however, advantageous to close valve 56".

The specific embodiments explained above all have at least one partial integration of simulator device 28 into master brake cylinder housing 10 or 50. At this point we point out once more, however, that such an integration is only optional. As an alternative to this, simulator piston 30 may also be situated between simulator chamber 32 and an anterior chamber in a displaceable manner, simulator chamber 32 and the anterior chamber being able to be developed in a simulator housing that is able to be situated separately from master brake cylinder housing 10 and 50. The anterior chamber may additionally be linked hydraulically to second pressure chamber 14 via at least one line. To do this, the simulator housing may be connected to at least one line of second brake circuit 42, for example. Many of the advantages stated above may also be transferred to such a specific embodiment.

What is claimed is:
1. A master brake cylinder system, comprising:
   a master brake cylinder housing having at least one first pressure chamber in it and a second pressure chamber in it;
   a rod piston that is at least partially displaceable into the first pressure chamber;
   a floating piston situated between the first pressure chamber and the second pressure chamber; and
   a simulator device having a simulator piston, which is at least partially displaceable into a simulator chamber against a spring force of at least one simulator spring that is present in the simulator chamber, wherein the simulator device includes at least one separating valve, via which the simulator chamber is linkable hydraulically only to a brake fluid reservoir, and wherein the simulator device includes at least one other valve, via which the simulator chamber is linkable hydraulically only to at least one pump;
   wherein the simulator piston of the simulator device is situated with respect to the second pressure chamber so that the simulator piston, using a pressure present in the second pressure chamber, is displaceable at least partially into the simulator chamber against the spring force of the at least one simulator spring.
2. The master brake cylinder system of claim 1, wherein the at least one simulator spring includes a rubber spring.

3. The master brake cylinder system of claim 1, wherein the simulator chamber has a first diameter aligned perpendicularly to a first displacement direction of the simulator piston, which is greater than a second diameter, of the second pressure chamber, which is aligned perpendicularly to a second displacement direction of the floating piston.

4. The master brake cylinder system of claim 1, wherein the simulator device is integrated at least partially into the master brake cylinder housing, and wherein the simulator piston is situated displaceably between the simulator chamber in the master brake cylinder housing and the second pressure chamber in the master brake cylinder housing.

5. The master brake cylinder system of claim 4, wherein the at least one simulator spring is supported on a side directed away from the simulator piston on an element, which is fastened at a distance from a cap that is mounted on the master brake cylinder housing in the simulator chamber.

\* \* \* \* \*